O. WINSTON.
HEADLIGHT.
APPLICATION FILED SEPT. 13, 1915.
1,277,518.
Patented Sept. 3, 1918.
4 SHEETS—SHEET 2.
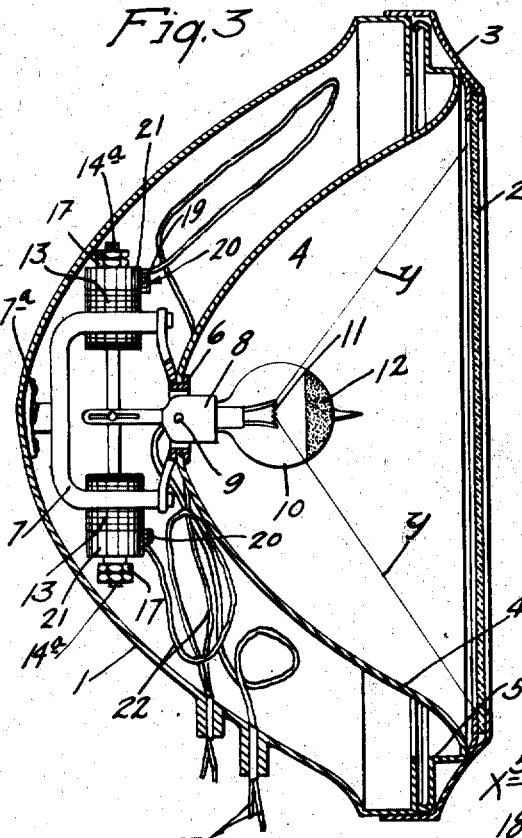
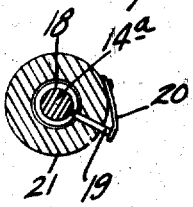
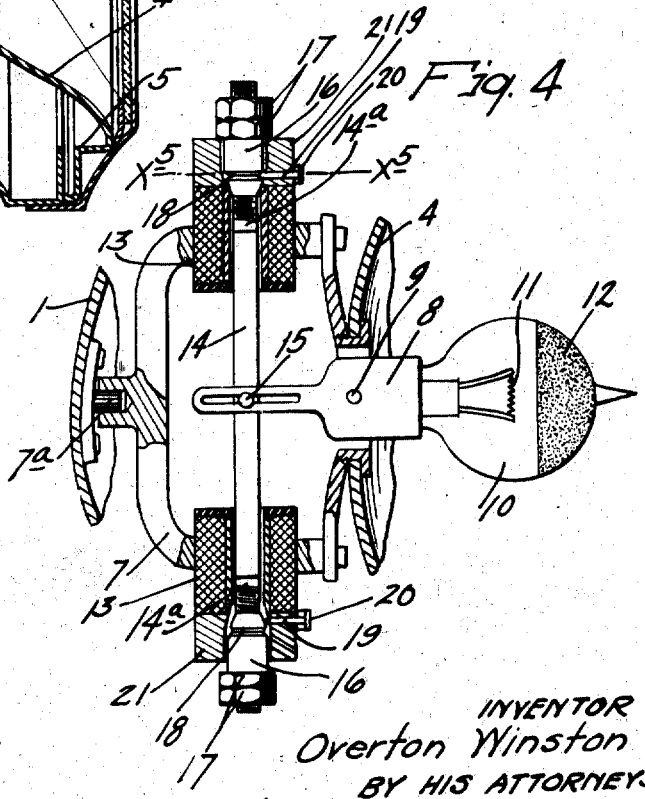
WITNESSES
E. C. Skinkle
B. G. Wheeler
INVENTOR
Overton Winston
BY HIS ATTORNEYS
Williamson Merchant

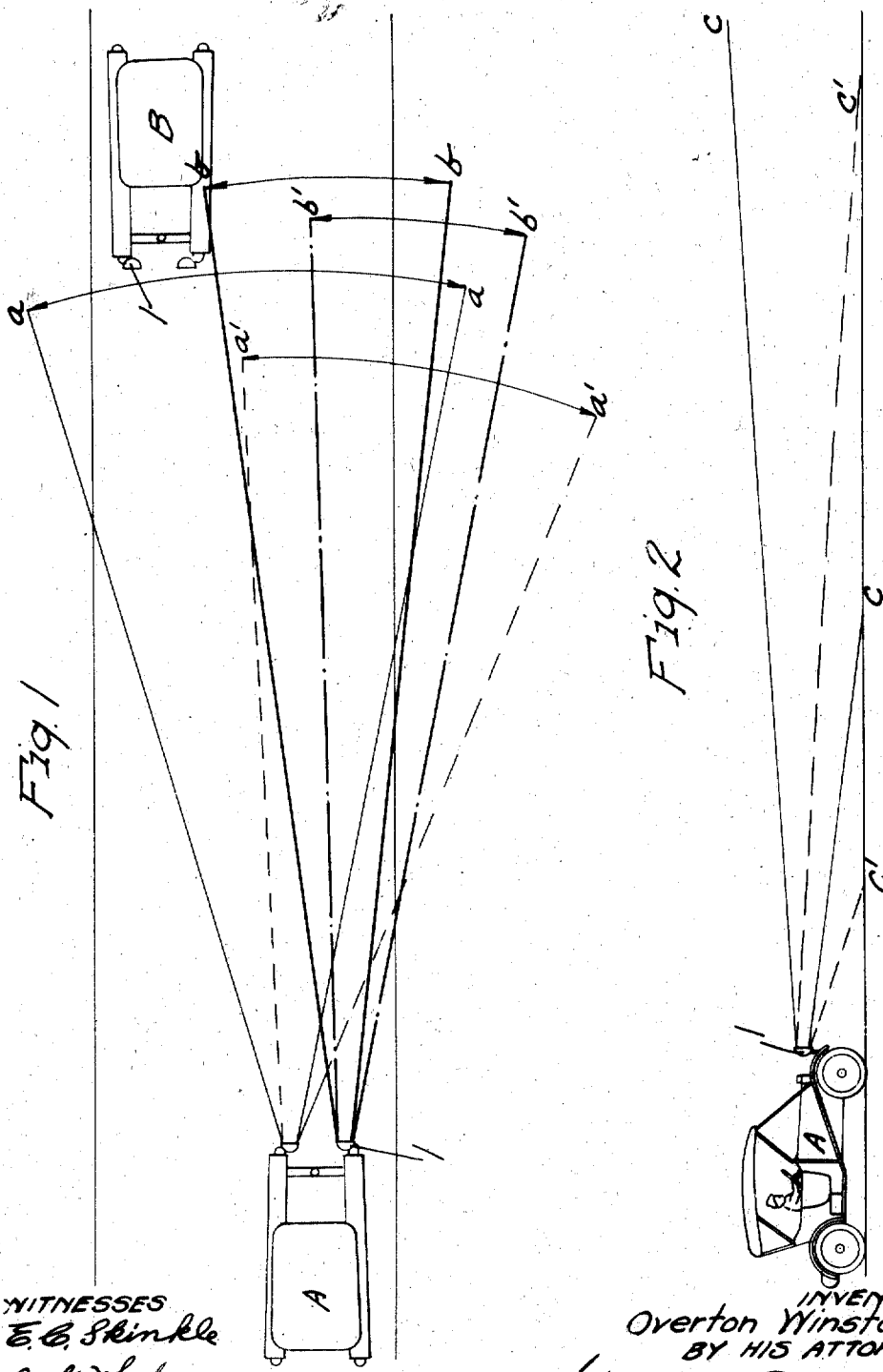

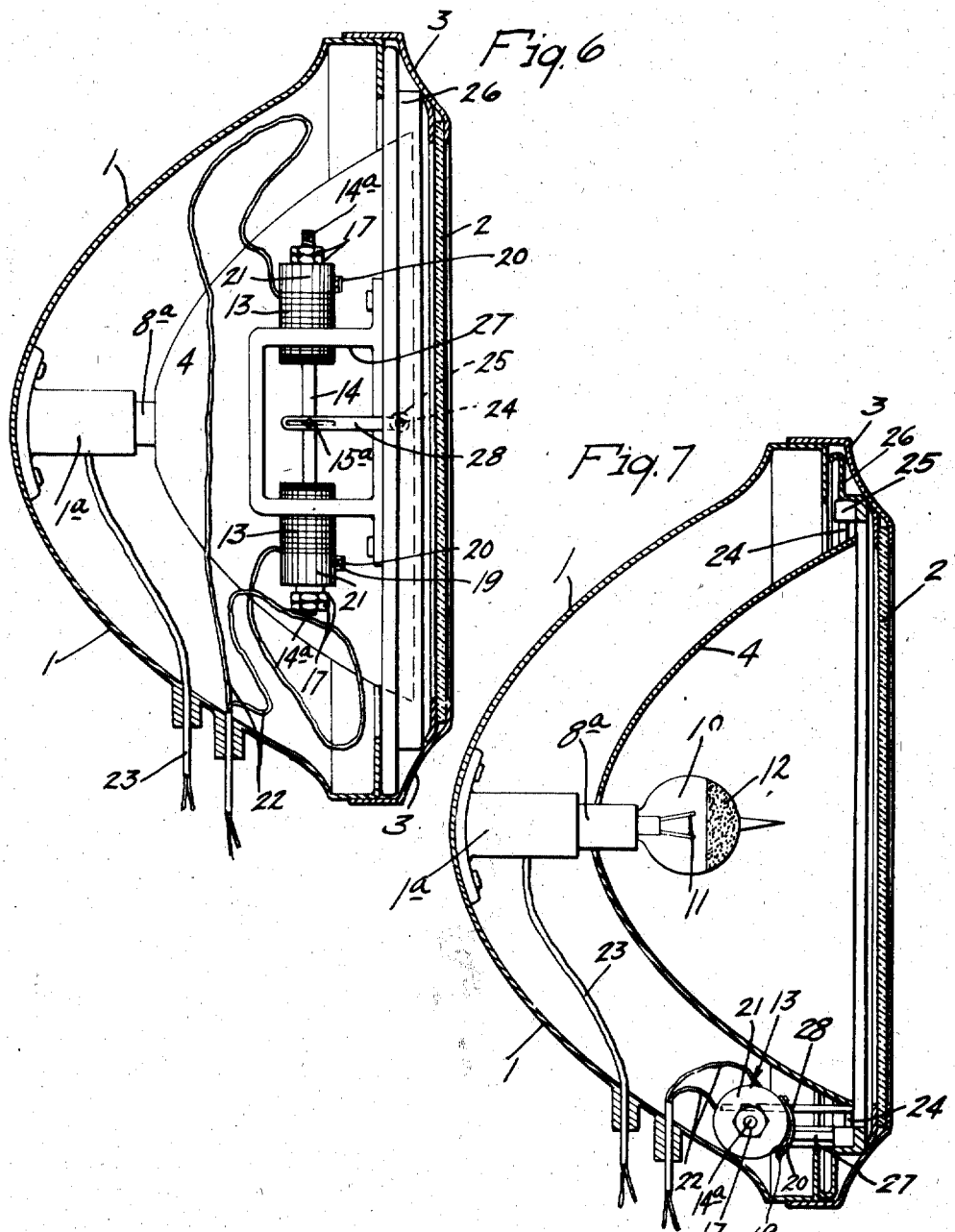

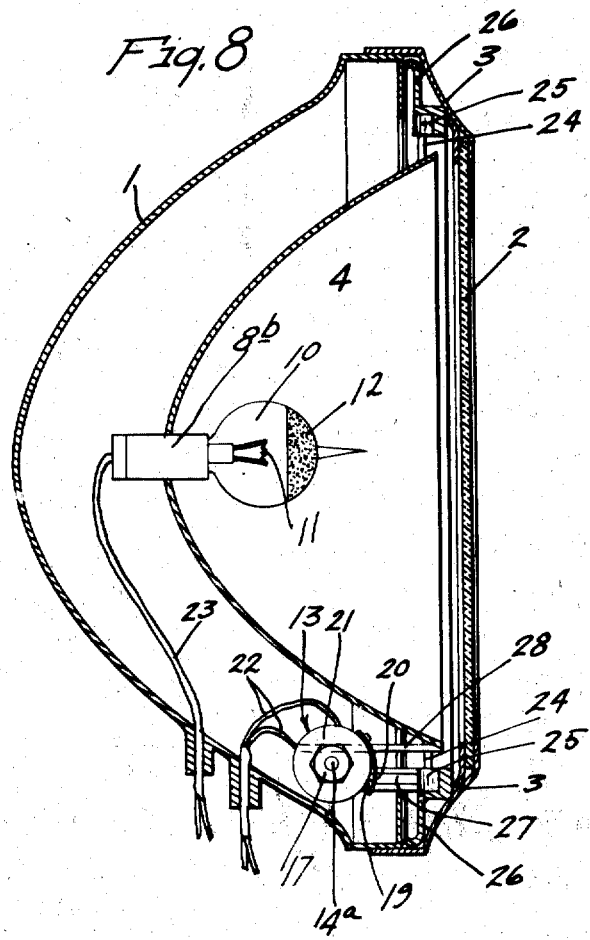

UNITED STATES PATENT OFFICE.

OVERTON WINSTON, OF MINNEAPOLIS, MINNESOTA.

HEADLIGHT.

1,277,518.　　　　Specification of Letters Patent.　　Patented Sept. 3, 1918.

Application filed September 13, 1915. Serial No. 50,296.

*To all whom it may concern:*

Be it known that I, OVERTON WINSTON, a citizen of the United States, residing at Minneapolis, in the county of Hennepin and State of Minnesota, have invented certain new and useful Improvements in Headlights; and I do hereby declare the following to be a full, clear, and exact description of the invention, such as will enable others skilled in the art to which it appertains to make and use the same.

Particularly, my present invention relates to electric head lights for use on automobiles, launches, and other vehicles, and is especially directed to the improvement thereof, for giving better service on motor propelled vehicles.

High power head lights with long projection are desirable on automobiles, and especially when running at high speed on country roads. Head lights of this character, however, as hitherto used, are very objectionable from the fact that they "blind" the driver of an approaching vehicle, and hence, are often the cause of serious accidents. For this reason, some districts have passed laws restricting or prohibiting the use of these high power head lights.

My invention provides means for regulating the beam projection of these high power head lights so that on clear roads, the light rays may be projected far ahead of the machine and over the entire road, and may be thrown to one side of the road, or down upon the road a shorter distance ahead of the machine, upon approaching another automobile or vehicle coming from the opposite direction. The above I accomplish with the use of a single light source, such as a single lamp filament, combined with means for shifting the said source or filament of the lamp, in respect to the axis of the reflector, or, conversely, by shifting the reflector in respect to the said source or filament, so that the position of the light source or filament is varied in respect to the axis of the reflector.

The drawings of the present application also disclose a novel arrangement of reflector, light source and frosting, which construction, however, is not herein claimed, but in modified form, is disclosed and broadly claimed in my co-pending application S. N. 106,373, filed June 28, 1916, entitled "Electric headlights". Also, the drawings of the present application disclose a novel relative arrangement of reflector and shifting light source which, in modified form, is disclosed and broadly claimed in my co-pending application S. N. 111,807, filed July 28, 1916, entitled "Headlights". Moreover, the drawings of the present application disclose a certain novel relative arrangement of light source and oscillatory reflector which is disclosed and claimed in my co-pending application, S. N. 132,039, filed November 18, 1916, entitled "Headlights", and a novel relative arrangement of reflector and light bulb, both of which are movable, in respect to a lamp casing or support and which is disclosed and claimed in my co-pending application, S. N. 132,040, filed November 18, 1916, and entitled "Headlights".

In the accompanying drawings which illustrate the invention, like characters indicate like parts throughout the several views.

Referring to the drawings:

Figure 1 is a plan view showing a road and two automobiles traveling in opposite directions, the one thereof being equipped with head lights in accordance with my invention;

Fig. 2 is a side elevation showing an automobile equipped with the improved head lights and illustrating, diagrammatically, the projection of the rays thereof;

Fig. 3 is a horizontal section taken through one of the improved head lights;

Fig. 4 is an enlarged horizontal section showing means for adjusting the lamp filament;

Fig. 5 is a section taken on the line $x^5\ x^5$ of Fig. 4;

Fig. 6 is a view corresponding to Fig. 3 but illustrating a modified construction;

Fig. 7 is a view corresponding to Fig. 6 but illustrating a still further modified construction; and Fig. 8 is a similar view corresponding to Fig. 7 illustrating a still further modified construction of the head light.

In the diagram views, Figs. 1 and 2, two reversely moving automobiles are indicated by the characters A and B. In the head light construction illustrated in Figs. 3, 4 and 5, the numeral 1 indicates the lamp casing which is secured to the automobile in the usual or any suitable way, and has an ordinary lens or glass disk 2 held in an annular frame 3 that is detachably applied on the rim of the casing 1, preferably by being telescoped thereon.

The reflector 4 has a flanged rim 5, at its outer edge, held with freedom for rotary adjustments of the reflector around its axis, between the detachable annular frame 3 and the adjacent flanged edge of the casing 1. At its axis, the reflector 4 has a perforation in which a flanged bearing sleeve 6 is seated; and this sleeve 6 has projecting arms that are rigidly secured to a magnet supporting bracket 7, which in turn, is swiveled at 7ᵃ to the back of the lamp casing 1. As illustrated, the reflector 4, by the sleeve 6, is connected to the magnet support 7 so that the two elements 4 and 7 will be given common rotary adjustments on the axis of the reflector. A lamp socket 8 projects through the bearing sleeve 6 and is intermediately pivoted thereto by small trunnions 9. An electric light bulb 10 is adapted to be secured in the socket 8 in the usual way. This bulb 10 has a filament 11, and the outer portion of the said bulb is frosted, or otherwise dimmed, or made translucent, over an area indicated at 12. The important relation of the frosted or dimmed surface 12 in respect to the light projecting passage through the frame 3, or in other words, through the lens, will be more fully considered later on.

In this particular arrangement, the lamp filament, and, in fact, the entire light bulb, is arranged to be shifted laterally to and from the axis of the reflector. This shifting movement may be accomplished in various ways, but is preferably accomplished by a pair of reversely-acting magnets and a coöperating core connected to the lamp socket. The magnets 13 are in the form of solenoids and are rigidly supported by the arms of the bracket 7. Working through the two solenoids 13 is a plunger 14, which, at its intermediate portion, is connected to a projecting slotted arm of the socket 8, by a slot and pin connection 15. The central portion of the plunger 14 will be of brass or other nonmagnetic metal, but its end portions 14ᵃ are of soft iron and are threaded. On the threaded portions 14ᵃ are adjustably mounted so-called latch sleeves 16 and coöperating lock nuts 17. The inner ends of the latch sleeves 16 are preferably made conical and just outward of the said conical ends, they are formed with annular V-shaped grooves 18 which coöperate with pointed latch pins 19 subject to the free ends of latch springs 20 secured to the projecting outer ends of the brass sleeves 21 of the solenoids 13.

In Fig. 3, the lead wires to the magnets 13 are indicated by the numeral 22 and the lead wires to the lamp are indicated by the numeral 23. Of course, the circuits 22 and 23 will be independent of each other, and, in practice, suitable push buttons or a switch will be employed in the circuit connections 22, so that the magnets 13 will be energized in alternate order. In the position of the parts shown in Figs. 3 and 4, the lamp bulb is adjusted so that the hot point of its filament will be at the axis of the reflector. The light bulb will be thrown into the position just stated when the far magnet 13 is energized. When the other or near magnet 13 is energized, the plunger 14—14ᵃ will be moved as shown in the drawings, and the light bulb will be moved laterally so that the hot point of its filament will then be offset from the axis of the reflector. Also, it will be noted that the spring-pressed latches 19 serve to yieldingly hold the light bulb in either one of the two adjustments in which it may be set by an energized magnet. This makes it possible to operate the lamp simply by instantaneous magnetic impulses, such as produced by momentary closing of a push button contact. Of course, the energy of the magnets or solenoids will be such as to readily overcome the said latches 19.

It is here important to note that by adjustments of the latch sleeve 16 on the plunger, the lamp may be adjusted for different positions in respect to the axis of the reflector. For example, it might be so adjusted that the hot point of its filament will be at the axis of the reflector in one position and will be offset more or less in another position, or the light bulb may be adjusted so that the hot point of its filament will be thrown from one side to the other of the axis of the reflector, and, in fact almost any conceivable adjustment may be given to the said light bulb.

Also, as is evident, by rotary adjustments of the reflector and magnet support 7, the axis of the pivot or trunnions 9 may be set horizontally or vertically, or at any inclination. Obviously, when the trunnions 9 are set in horizontal position, movements of the light bulb will be in a vertical plane; and, on the other hand, when the said trunnions are set in a vertical position, the adjustments of the light bulb will be in a horizontal plane; and when the said trunnions 9 are set obliquely, the adjustments of the lamp will be in an oblique plane. Adjustments of the lamp in a vertical plane will vary the distance that the light beams will be projected in front of the machine; adjustments of the lamp bulb in a horizontal direction will shift the light beams laterally on the road; and adjustments of the said lamp in an oblique plane will simultaneously vary the projection of the light beams in front of the machine and shift the same laterally on the road. For these various adjustments therefor, a large variation in the projection of the light beams on the road may be accomplished.

Instead of oscillating the light bulb in respect to the reflector, the reflector may be oscillated in respect to the light bulb, or both the reflector and light bulb may be simultaneously oscillated.

In the construction illustrated in Figs. 6 and 7, the light bulb 10 is applied to a lamp socket 8ª, which, in turn, is fixed to a support 1ª rigidly secured to the back of the lamp casing 1, and the reflector 4 has diametrically projecting trunnions 24 journaled in small bearings 25 secured on a ring 26 mounted for rotary adjustments between the annular frame 3 and the flanged edge of the casing 1. At its axis, the reflector 4 has a passage through which the lamp socket 8ª projects with sufficient clearance, to permit the required oscillatory adjustments of the reflector.

To oscillate the reflector, the solenoids 13 and cooperating core 14 and 14ª and coacting latch device, are preferably employed, but the said solenoids, in this instance, are secured to a bracket 27, which, in turn is rigidly secured to the adjustable ring 26. The reflector 4, at one edge, has a backwardly projecting arm 28 which, as shown, is connected to the intermediate portion of the plunger 14, by a slot and pin connection 15ª. With this arrangement, it will be seen that the light bulb and filament remain stationary and that the reflector will be oscillated by the action of the solenoids. Such adjustments of the reflector, however, vary the position of the lamp filament in respect to the axis of the reflector. By rotary adjustments of the ring 26, the axis of the trunnions 24 may be set vertically or horizontally, or at any desired inclination, so that the beams may be correspondingly deflected.

The construction illustrated in Fig. 8 is like that illustrated in Figs. 6 and 7, except that the lamp socket 8ᵇ is secured to the back of the reflector, so that the lamp bulb 10 and reflector will be given common oscillatory adjustments to deflect the light beams.

The radiating lines marked Y on Fig. 3 show that the unobstructed direct light rays from the lamp filament are not projected through the lens or light projecting passage of the head light, and hence, cannot be directly seen from in front of the head light. However, the reflected rays are not obstructed. Where the so-called dimmed portion of the lamp is frosted or colored, the direct light rays will pass to some extent, but will be dimmed or diffused, so that they will not produce the objectionable glare. Preferably, the so-called dimmed surface is translucent, but it might, in some instances, be made opaque.

Usually, and I believe preferably, the source of light would be the filament of an incandescent lamp, but it might be of an arc lamp or even a gas flame or other flame from a hydrocarbon burner. The so-called dimmed surface which, as shown, is on an electric light bulb, is, in a broad sense, a direct ray-obstructing surface which is located between the light source and the lens or light projecting passage of the head light or light font.

As shown, and preferably, I employ the electro-magnetic device for oscillating the light source or bulb and the reflector, or both, but a mechanical device may be employed for the above purpose.

In the diagram view, Fig. 1, the full lines $a$—$a$ indicate the outside rays of the beam of light which is projected from one of the head lights onto the road bed at a relatively short distance ahead of the machine; and the full lines $b$—$b$ indicate the outer rays of a beam of light projected from the other head light onto the road bed at a relatively long distance ahead of the machine. For example, it may be assumed that the rays $a$—$a$ strike the road bed fifty feet ahead of the machine and that the rays $b$—$b$ strike the ground one hundred and fifty feet, or more, ahead of the machine. The dotted lines $a^1$—$a^1$ indicate the extent to which the beam $a$—$a$ may be shifted to one side of the road in passing another machine, and the dotted lines $b^1$—$b^1$ indicate the extent to which the beam $b$—$b$ may be projected to one side of the road bed in passing a machine.

In the diagram view, Fig. 2, the full lines $c$—$c$ indicate the projection of a beam of light far ahead of the machine, and the dotted lines $c^1$—$c^1$ indicate an extent to which the beam may be shortened and projected onto the road bed a relatively short distance ahead of the machine. To effect the adjustments diagrammatically indicated in Fig. 1, the light source or the reflector must be adjusted horizontally, while to affect the adjustments of the beams illustrated in Fig. 2, the said light source or the reflector must be adjusted vertically. However, as already indicated, by adjusting the light source of the reflector obliquely, more or less of both of the adjustments of the beams illustrated in Figs. 1 and 2 may be simultaneously accomplished. In any case, the width of the beams from the lamp set to project a relatively short distance ahead of the machine may be so wide that it will be difficult or undesirable to deflect the same to one side of the road, and in this case, may be found more practical to entirely cut out the short distance light in passing a machine. Also, if found desirable, the long distance light might be cut out in passing the machine.

The term "reflector" is herein used in a liberal sense, and would include a lamp housing even if such housing were not especially prepared to act as a reflector.

The term "axis," as applied to the reflector, is herein used in a liberal sense to mean an imaginary line extended through the central portion of the reflector, or that part thereof which most nearly corresponds to the axis, regardless of whether or not the reflector has a true axis of rotation.

What I claim is:

1. In a headlight, the combination with a reflector and a light source mounted therein, one of which elements is adjustable transversely of the axis of said reflector, the said reflector being mounted for rotary movements and arranged to set the adjustable element for movements either in a vertical or horizontal direction.

2. In a headlight, the combination with a reflector and a light source mounted therein, one of which elements is adjustable transversely of the axis of said reflector, the said reflector being mounted for rotary movements and arranged to set the adjustable element for movements either in a vertical or horizontal direction, and means for effecting the movements of said adjustable element from a point distant from said headlight.

3. In a headlight, the combination with a casing, of a reflector mounted therein for rotary adjustments around its axis, a lamp socket pivotally connected to said reflector for moving a light bulb transversely of the axis thereof, but itself adjustable with said reflector, and an electro-magnetic device operative on said socket and carried by said reflector so that it is operative on said socket in the various rotary adjustments of said reflector.

4. In a headlight, the combination with a reflector and a lamp located therein, one of said elements being adjustable transversely of the axis of said reflector, latches for holding said movable element in both extreme positions, and electro-magnetic means for moving said lamp in both directions and for overcoming or releasing the said latches.

5. In a headlight, the combination with a reflector and a lamp located therein, of an adjustable support for said lamp, latch mechanism yieldingly holding said lamp in differently adjusted positions, and means for overcoming said latch mechanism and moving the said lamp from the one position to the other, the said latch mechanism being adjustable to vary the set positions of said lamp.

6. In a headlight, the combination with a reflector and a light source therein, one of which is adjustable in respect to the other, of electro-magnetic means operative magnetically to impart both of the opposite adjustments to the adjustable member, and operative, at will, to move the same in either direction, and latches for holding said movable member in both extreme positions arranged to be overcome or released by said electro-magnetic means.

7. In a headlight, the combination with a reflector and a light source therein, one of which is adjustable in respect to the other, of electro-magnetic means operative magnetically to impart both of the opposite adjustments to the adjustable member, and operative, at will, to move the same in either direction, and yielding spring latches arranged to be automatically overcome and released by said electro-magnetic means.

8. In a headlight, the combination with a reflector and a light source therein, one of which elements is adjustable transversely of the axis of said reflector and is rotatively adjustable so that it will oscillate either in an approximately horizontal or an approximately vertical plane.

9. In a headlight, the combination with a reflector and a lamp located therein, one of said elements being adjustable transversely of the axis of said reflector, latches for holding said movable element in extreme positions, and electromagnetic means for moving said lamp in both directions and for releasing said latches.

10. In a headlight, the combination with a casing and a reflector having a rim connection therewith, but spaced therefrom, of a lamp socket extended through the back of said reflector and pivotally connected thereto, an electro-magnetic socket actuating means including an electro-magnet, and means independent of said rim connection definitely positioning said reflector, magnet and socket pivot in respect to each other, in a direction transversely of the reflector.

11. In a headlight, the combination with a casing and a reflector secured therein but spaced therefrom, of a supporting frame located in the space between the back of said reflector and said casing and secured in part to both thereof and serving as a rear connection between the two, of a lamp socket movably supported on said frame in position to support an electric light bulb within said reflector, and electro-magnetic means for transversely moving said socket, mounted on and supported by said frame.

12. In a headlight, the combination with a casing and a concave reflector secured therein but spaced therefrom, of a frame located in the space between the back of said reflector and said casing and rotatably mounted on said casing, a lamp socket pivotally mounted on said frame and positioned to support an electric light bulb within said reflector, and electro-magnetic means for oscillating said socket, directly mounted on and supported by said frame.

13. In a headlight, the combination with a reflector, of a lamp socket adapted to hold an electric light bulb and movable to shift said bulb from the axis to a point above the axis of said reflector, a latch for holding said socket in its axial position, and means for moving said socket instantly from one position to another and for overcoming or releasing said latch.

14. In a headlight, the combination with a reflector, of a lamp socket adapted to hold an electric light bulb and movable to shift the same from one position to another, transversely of the axis of said reflector, a latch for holding said socket in one extreme position, and electro-magnetic means for releasing said latch and moving said socket away from the position in which it was held by said latch.

15. In a headlight, a reflector, a lamp socket mounted on a pivot for moving an electric lamp toward and from the axis of said reflector, means for instantly moving said socket from one extreme position to another, stops for limiting the extreme movements of said socket, and means at the rear of said reflector independent of the rim thereof, whereby said reflector, socket pivot and stops are set and maintained in definite relative positions, transversely of the reflector.

16. In a headlight, a casing, a reflector having a rim connection to said casing, a lamp socket, a pivot on which said socket is mounted for moving a light bulb toward and from the axis of said reflector, spaced socket stops for limiting the extreme movements of said socket, means for instantly moving said socket from one extreme position to another, and means on the back of said reflector, independent of said rim connection, positively holding said pivot and stops in definite fixed relation in respect to the axis of said reflector.

17. In a headlight, the combination with a casing and a reflector having a rim connection with said casing but spaced therefrom, of a lamp socket extended through the rear of said reflector and adapted to support an electric lamp within said reflector, said socket being securely pivoted to the rear portion of said reflector, and adapted to be swung vertically, instantly from a lower extreme position to an upper extreme position, stops for limiting the extreme swinging movements of said socket, and means at the rear of said reflector, independent of the rim connection between said reflector and casing, whereby said stops are accurately positioned vertically, in respect to said reflector and socket pivots.

In testimony whereof I affix my signature in presence of two witnesses.

OVERTON WINSTON.

Witnesses:
HARRY D. KILGORE.
F. D. MERCHANT.